(No Model.)
M. A. EMERSON.
PARAFFIN VESSEL.
No. 588,324. Patented Aug. 17, 1897.
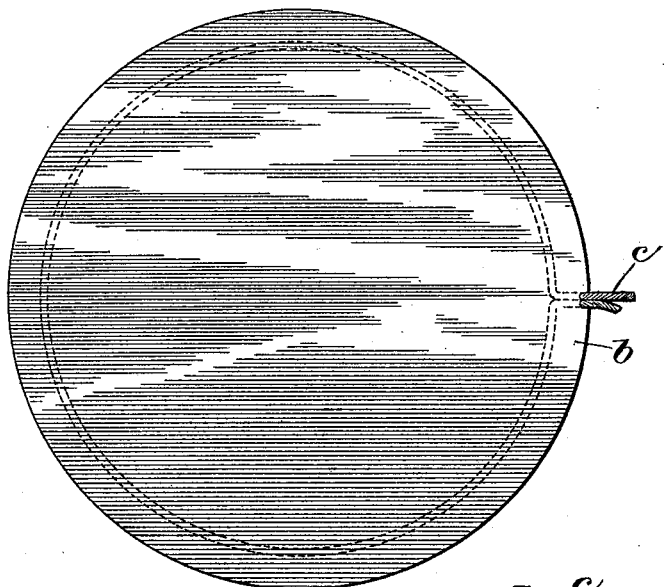
Fig. 1.
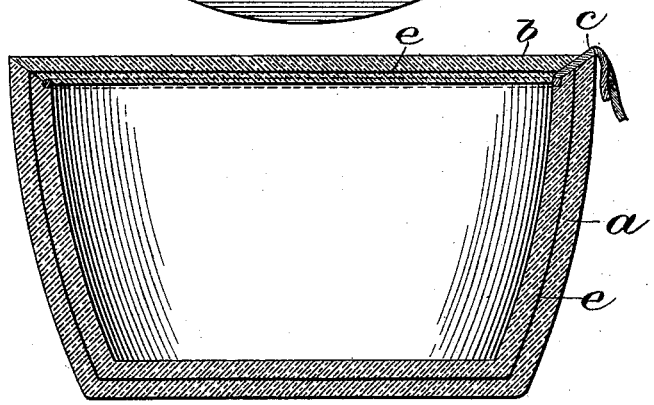
Fig. 2.
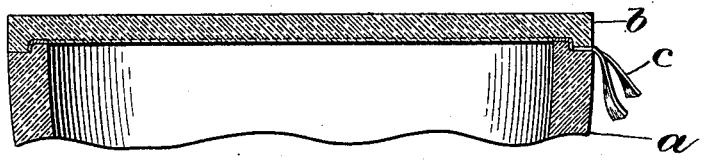
Fig. 3.
Fig. 4.
Witnesses
Arthur T. Randall
L. M. Garrett
Inventor:
Mary A. Emerson
by B. J. Hayes
atty.
THE NORRIS PETERS CO., PHOTO-LITHO., WASHINGTON, D. C.

UNITED STATES PATENT OFFICE.

MARY A. EMERSON, OF WALTHAM, MASSACHUSETTS.

PARAFFIN VESSEL.

SPECIFICATION forming part of Letters Patent No. 588,324, dated August 17, 1897.

Application filed November 7, 1896. Serial No. 611,309. (No model.)

*To all whom it may concern:*

Be it known that I, MARY A. EMERSON, of Waltham, county of Middlesex, and State of Massachusetts, have invented an Improvement in Paraffin Vessels, of which the following description, in connection with the accompanying drawings, is a specification, like letters on the drawings representing like parts.

This invention has for its object to construct a self-sealing hollow article—that is to say, a hollow article having a cover which when applied under certain conditions will seal itself in place and thereby produce a tight vessel.

In the manufacture of self-sealing hollow articles I will use paraffin-wax, or material commonly known as "paraffin," and by means of suitable molds will form the articles and the covers therefor, and when said covers are placed in position they will readily become sealed, and particularly if subjected to a warm temperature or if the points of contact are warmed. In preparing empty articles of this kind for shipment it is desirable to provide against self-sealing, and in doing so I may place a piece of tape or twine at the joint or point of contact between the cover and the article, and such tape or twine will under ordinary conditions prevent said cover from sealing itself to the article. When the hollow vessel is filled and the cover applied, said tape or twine may still be used at the joint, if desired, it being sealed in at such point with one or both of its ends projecting for a short distance, and then when it is desired to remove the cover or to open the vessel said tape or twine may be pulled or drawn out, and in so doing will cut open the vessel; but I do not desire to limit my invention to thus using the tape or twine as a means of opening the sealed vessel, as well as the means for preventing the cover from sealing itself to the empty vessel.

In some cases, where an extra strong vessel is desired, cloth or equivalent fibrous material may be incorporated in the paraffin as a core.

Figure 1 shows in plan view a self-sealing vessel having a piece of tape or twine inserted between the cover and the vessel to prevent said cover from sealing itself in place; Fig. 2, a vertical section of the self-sealing vessel shown in Fig. 1, the cover being fitted down tightly and sealed in; Figs. 3 and 4, vertical sections of the self-sealing vessels, showing modified forms of joints for the cover.

The hollow vessel $a$, which may be made of any suitable shape or size, is composed of paraffin, being molded or otherwise constructed, and its cover $b$ is likewise composed of paraffin.

The upper edge of the vessel $a$ may be beveled to receive the bevel-edged cover $b$, as shown in Fig. 2, or the upper edge of the vessel $a$ may have formed on it a shoulder, and the edge of the cover $b$ may be similarly shouldered, as shown in Fig. 3; or the upper edge of the vessel $a$ may be formed with an annular groove and the cover $b$ formed with a corresponding projection, as shown in Fig. 4; or in fact the upper edge of the vessel may be formed in any desirable way to receive the cover, the edge of which is adapted to fit upon it.

As both the vessel $a$ and the cover $b$ are composed of paraffin, the points of contact of said parts present self-sealing surfaces, which when brought into contact in a warm temperature or when slightly heated will become sealed. If such a hollow vessel is made and fitted with a cover and then shipped empty, there is great liability of the covers becoming sealed in shipment, and to obviate this difficulty a piece of tape or twine $c$ can be used, which forms an essential feature of this invention. This piece of tape or twine may be laid between the parts in any desirable way so long as it is so interposed as to prevent the parts becoming sealed while being shipped empty, and different widths of tape may be used, according to the particular form of joint employed. This tape or twine $c$ is made in any form, so that when interposed one or both of its ends will project for a short distance, so as to be easily accessible.

When it is desired to use the vessel, the cover will be removed and also the interposed tape or twine, and in thereafter applying the cover it may be warmed or the entire vessel may be subjected to a suitable temperature, so that the cover will soon become sealed to the vessel. It will be understood that in such case the cover will be applied without the tape or twine and the vessel will be opened with a knife or in any desirable way; or the tape or twine may, if desired, be sealed in with the cover with its ends projecting more or less, as shown, and when so sealed in it may be used as a means of cutting open the vessel by withdrawing it.

When it is desired to increase the strength of the vessel, cloth or any equivalent fibrous material may be incorporated in the manufacture of the vessel, as shown at *e*, Fig. 2.

I claim—

1. The self-sealing hollow article herein described composed of a vessel having a cover fitted to it, both parts of which are composed of paraffin and fibrous material, thereby presenting a self-sealing joint at their points of contact and a piece of tape or equivalent interposed between said self-sealing surfaces.

2. A hollow article having a cover fitted to it, both parts of which are composed of paraffin, thereby presenting a self-sealing joint at their points of contact, and a piece of tape or equivalent interposed between said self-sealing surfaces, substantially as described.

3. A hollow article having a cover fitted to it, both parts of which present self-sealing surfaces at their points of contact, with a piece of tape or equivalent interposed between said self-sealing surfaces, substantially as described.

4. A hollow article having a cover fitted to it both parts of which are composed of paraffin or its equivalent, thereby presenting self-sealing surfaces at their points of contact, with a piece of tape or equivalent interposed between said self-sealing surfaces having projecting ends, substantially as described.

5. A hollow article having a cover fitted to it both parts of which are composed of paraffin or its equivalent thereby presenting self-sealing surfaces at their points of contact, with a piece of tape or equivalent interposed between said self-sealing surfaces and adapted to be sealed in and used as a means of separating the sealed cover from the article, substantially as described.

In testimony whereof I have signed my name to this specification in the presence of two subscribing witnesses.

MARY A. EMERSON.

Witnesses:
B. J. NOYES,
L. M. GARBUTT.